United States Patent
Miyahara

(10) Patent No.: US 12,488,076 B2
(45) Date of Patent: Dec. 2, 2025

(54) AUTHENTICATION DEVICE, AUTHENTICATION METHOD, AND RECORDING MEDIUM USING OTOACOUSTIC AUTHENICATION

(71) Applicants: NEC Corporation, Tokyo (JP); NEC Platforms, Ltd., Kawasaki (JP)

(72) Inventor: Ryoji Miyahara, Kanagawa (JP)

(73) Assignees: NEC CORPORATION, Tokyo (JP); NEC Platforms, Ltd., Kanagawa (JP)

(*) Notice: Subject to any disclaimer, the term of this patent is extended or adjusted under 35 U.S.C. 154(b) by 162 days.

(21) Appl. No.: 18/281,866

(22) PCT Filed: Mar. 18, 2021

(86) PCT No.: PCT/JP2021/011015
§ 371 (c)(1),
(2) Date: Sep. 13, 2023

(87) PCT Pub. No.: WO2022/195792
PCT Pub. Date: Sep. 22, 2022

(65) Prior Publication Data
US 2024/0311458 A1 Sep. 19, 2024

(51) Int. Cl.
*G06F 21/00* (2013.01)
*G06F 3/01* (2006.01)
(Continued)

(52) U.S. Cl.
CPC .............. *G06F 21/32* (2013.01); *G06F 3/017* (2013.01); *H04R 1/1091* (2013.01)

(58) Field of Classification Search
CPC ....... G06F 21/32; G06F 3/017; H04R 1/1091; H04R 1/10; H04R 1/1016; H04R 1/1041
See application file for complete search history.

(56) References Cited

U.S. PATENT DOCUMENTS

2017/0289145 A1* 10/2017 Boesen ................ H04R 1/1016
2017/0347180 A1* 11/2017 Petrank .................... G06F 3/165
(Continued)

FOREIGN PATENT DOCUMENTS

JP   2010-510602 A   4/2010
JP   2018-078398 A   5/2018
(Continued)

OTHER PUBLICATIONS

Japanese Office Action for JP Application No. 2023-506617 mailed on Nov. 12, 2024 with English Translation.
(Continued)

*Primary Examiner* — William A Corum, Jr.
(74) *Attorney, Agent, or Firm* — Sughrue Mion, PLLC

(57) ABSTRACT

An authentication management device acquires first position information indicating a change in the position of a user's earphone equipped with a first authentication means based on otoacoustic authentication; on the basis of the acquired first position information, estimates motion of the user wearing the earphone by generating motion information indicating the motion of the user; and executes authentication of the user in a device connected to the earphone on the basis of the result of the authentication by otoacoustic authentication and the motion information.

6 Claims, 11 Drawing Sheets

(51) Int. Cl.
     *G06F 21/32*      (2013.01)
     *H04R 1/10*      (2006.01)

(56) References Cited

U.S. PATENT DOCUMENTS

| | | |
|---|---|---|
| 2019/0189129 A1 | 6/2019 | Arakawa et al. |
| 2019/0230426 A1* | 7/2019 | Chun ........................ H04R 1/10 |
| 2020/0342082 A1* | 10/2020 | Sapozhnykov ........ G06V 40/10 |
| 2021/0103646 A1* | 4/2021 | Koshinaka ............... H04R 3/00 |
| 2021/0366450 A1 | 11/2021 | Takahashi et al. |
| 2023/0118074 A1* | 4/2023 | Park ........................ G01S 13/02 |
| | | 345/156 |
| 2024/0196125 A1* | 6/2024 | Arbel .................... H04B 11/00 |

FOREIGN PATENT DOCUMENTS

| | | |
|---|---|---|
| JP | 2019-523581 A | 8/2019 |
| WO | 2018/034178 A1 | 2/2018 |
| WO | 2020/090223 A1 | 5/2020 |

OTHER PUBLICATIONS

International Search Report for PCT Application No. PCT/JP2021/011015, mailed on Jun. 15, 2021.

\* cited by examiner

| PATTERN | PROXIMITY SENSOR (mW) | | ACCELERATION SENSOR (m/s²) | | ANGULAR VELOCITY SENSOR (deg/s) | | ORIENTATION SENSOR (deg) | | MOTION |
|---|---|---|---|---|---|---|---|---|---|
| | RIGHT | LEFT | RIGHT | LEFT | RIGHT | LEFT | RIGHT | LEFT | |
| 1 | ○ | ○ | a-b | a-b | A-B | A-B | K-L | K-L | WALKING |
| 2 | ○ | ○ | c-d | c-d | C-D | C-D | M-N | M-N | RUNNING |
| 3 | ○ | × | e-f | e-f | E-F | E-F | O-P | O-P | ELEVATOR ASCENDING |
| 4 | ○ | × | g-h | g-h | C-D | C-D | Q-R | Q-R | STATIONARY |

AUTHENTICATION DEVICE, AUTHENTICATION METHOD, AND RECORDING MEDIUM USING OTOACOUSTIC AUTHENICATION

This application is a National Stage Entry of PCT/JP2021/011015 filed on Mar. 18, 2021, the contents of all of which are incorporated herein by reference, in their entirety.

TECHNICAL FIELD

This disclosure relates to an authentication management device, an estimation method, and a recording medium.

BACKGROUND ART

Patent Reference 1 is described in which content playback is controlled based on a prediction result of the user's movement behavior. Patent Referene 2 is described in which earphones are equipped with a gyro sensor and a geomagnetic sensor to ascertain the user's head orientation and thereby play content according to the user's head orientation.

CITATION LIST

Patent References

Patent Reference 1: PCT International Publication No. WO 2020/090223
Patent Reference 2: Japanese Unexamined Patent Application, First Publication No. 2018-078398

SUMMARY

Problems to be Solved

In the references inventions described in Patent References 1 and 2, content is only provided in response to the user's movement or body orientation.

In view of the above circumstances, an example object of the present disclosure is to provide an authentication management device, an estimation method, and a recording medium that solve the above problem.

Means for Solving the Problem

One example aspect of the present disclosure is an authentication management device provided with a first position acquisition means that acquires first position information indicating a change in the position of a user's first earphone equipped with a first authentication means based on otoacoustic authentication; an estimation means that, on the basis of the acquired first position information, estimates motion of the user wearing the first earphone by generating motion information indicating the motion of the user; and a second authentication means that executes authentication of the user in a device connected to the first earphone on the basis of the result of the authentication by otoacoustic authentication and the motion information.

EXAMPLE EMBODIMENT

Figure 1:
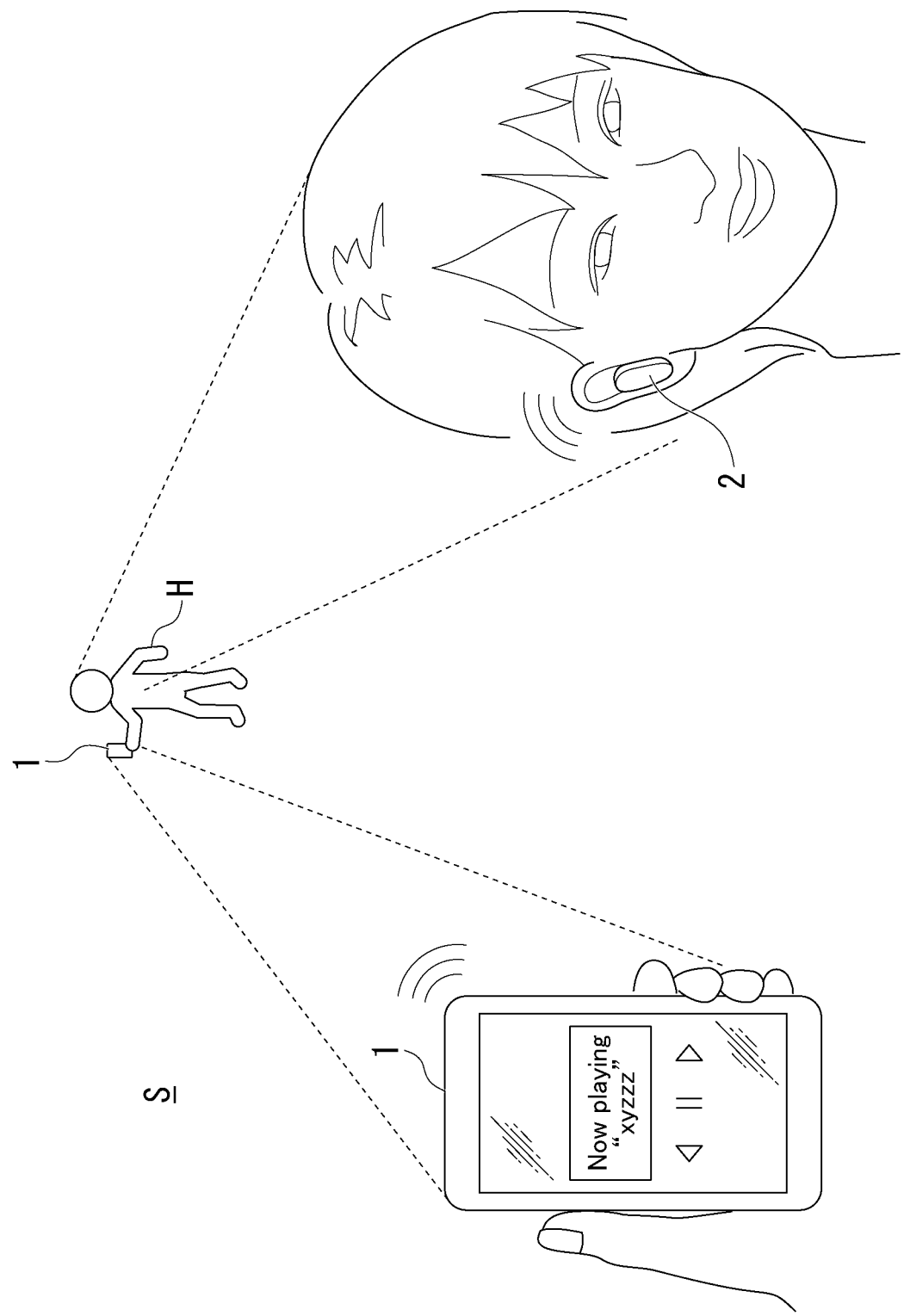
FIG. 1 is a drawing that shows an example of the configuration of the estimation system S in the first example embodiment.

Example embodiments are described in detail below with reference to the accompanying drawings. The following example embodiments are not intended to limit the scope of the claims, and not all of the combinations of features described in the example embodiments are essential to the disclosure. Two or more of the plurality of features described in the example embodiments may be optionally combined. The same reference numerals are used for identical or similar configurations, and redundant explanations are omitted.

First Example Embodiment

FIG. 1 shows an example of the configuration of the estimation system S in the first example embodiment. The estimation system S is provided with an information communication device 1 and an earphone 2. The information communication device 1 and the earphone 2 may be referred to as the authentication management device. A user H wears the earphone 2 in his or her ear. The user H uses the information communication device 1. The information communication device 1 is an electronic device equipped with a communication function. The information communication device 1 can be, for example, a smartphone, a tablet computer, a wristwatch-type portable terminal, or a personal computer (PC).

In FIG. 1, music is being played by the information communication device 1, and the user H is listening to the music using the earphone 2. The information communication device 1 and the earphone 2 are connected to each other by wireless communication. Although not shown in the figure, the earphone 2 may be connected to the information communication device 1 by a wire. The information communication device 1 and the earphone 2 may be configured as a single device, or yet another device may be included within the estimation system S. In this specification, "sound" such as sound waves and audio shall include non-audible sounds whose frequency or sound pressure level is outside the audible range.

The information communication device 1 is communicatively connected to the earphone 2. The information communication device 1 controls the operation of the earphone 2, transmits audio data for generating sound waves emitted from the earphone 2, and receives audio data obtained from sound waves received by the earphone 2. Specifically, in the case where the user H uses the earphone 2 to listen to music, the information communication device 1 sends compressed data of music to the earphone 2.

In the case where the earphone 2 is connected to a portable terminal for business use at an event site, hospital, or the like, the information communication device 1 may transmit audio data of business instructions to the earphone 2. In this case, the earphone 2 may transmit the audio data of the user H's speech to the information communication device 1. The information communication device 1 or earphone 2 may be provided with the function of otoacoustic authentication using the sound waves received by the earphone 2. In this specification, "sound" such as sound waves and audio shall include non-audible sounds whose frequency or sound pressure level is outside the human audible range.

Figure 2:
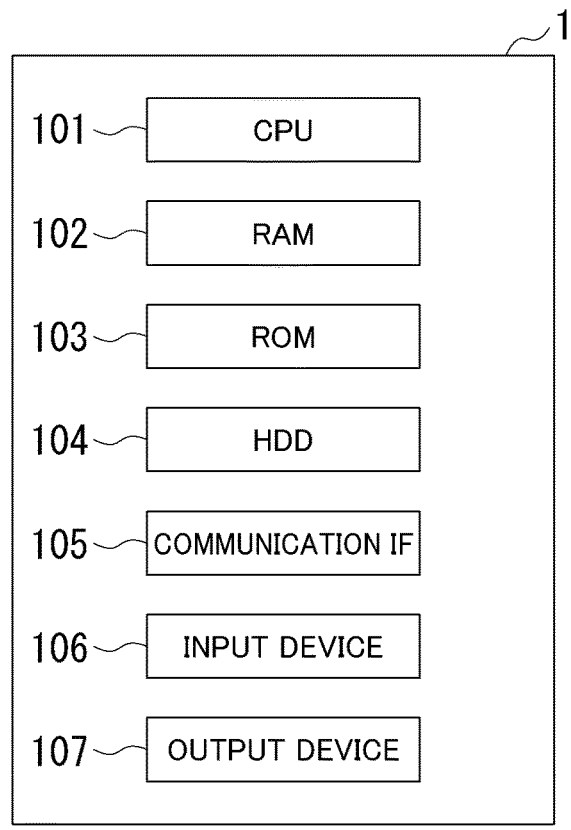
FIG. 2 is a block drawing that shows the hardware configuration of the information communication device 1 in the first example embodiment.

FIG. 2 is a block diagram showing the hardware configuration of the information communication device 1 in the first example embodiment. The information communication device 1 is provided with a central processing unit (CPU) 101, random access memory (RAM) 102, read-only memory (ROM) 103, and a hard disk drive (HDD) 104.

The information communication device 1 also has a communication interface (IF) 105, an input device 106, and output device 107. The CPU 101, RAM 102, ROM 103, HDD 104, communication IF 105, input device 106, and output device 107 are interconnected via buses, wiring, and driving devices not shown in FIG. 2.

The CPU 101 performs predetermined calculations in accordance with programs stored in the ROM 103, HDD 104, and the like. The CPU 101 is a processing unit that also has the function of controlling each part of the information communication device 1. The RAM 102 consists of a volatile storage medium. The RAM 102 provides a temporary memory area. The temporary memory area is necessary for the operation of the CPU 101.

The ROM 103 consists of a nonvolatile storage medium. The ROM 103 stores necessary information such as programs used in the operation of the information communication device 1. The HDD 104 consists of a nonvolatile storage medium and is a storage device that temporarily stores data sent and received to/from the earphone 2, stores programs for operating the information communication device 1, and so on. The HDD 104 may be a solid-state drive (SSD) instead of a HDD. If the information communication device 1 is a smartphone or wristwatch-type portable terminal, the information communication device 1 does not have to be equipped with the HDD 104.

The communication IF 105 is a communication interface that enables transmission and reception of data and control information, and the like, to/from other devices. The communication IF 105 is based on standards such as Bluetooth (registered trademark) and Wi-Fi (registered trademark), for example.

The input device 106 is a device used by the user H to operate the information communication device 1. The input device 106 may be a touch screen panel, for example, or a keyboard, mouse, trackball, or pen input device.

The output device 107 is a display device used for display of a graphical user interface (GUI) for operation input. The output device 107 is a liquid crystal display, organic electroluminescence (EL) display, and the like. The input device 106 and the output device 107 may be integrally formed as a touch panel.

The hardware configuration shown in FIG. 2 is an example. Additional devices other than those shown in FIG. 2 may be added, or some devices may not be provided. Some of the devices shown in FIG. 2 may be replaced by other devices with similar functions. Furthermore, some functions of this example embodiment may be provided by other devices via a network. The functions of this example embodiment may be distributed and realized in multiple devices. The hardware configuration shown in FIG. 2 can be modified as needed.

Figure 3:
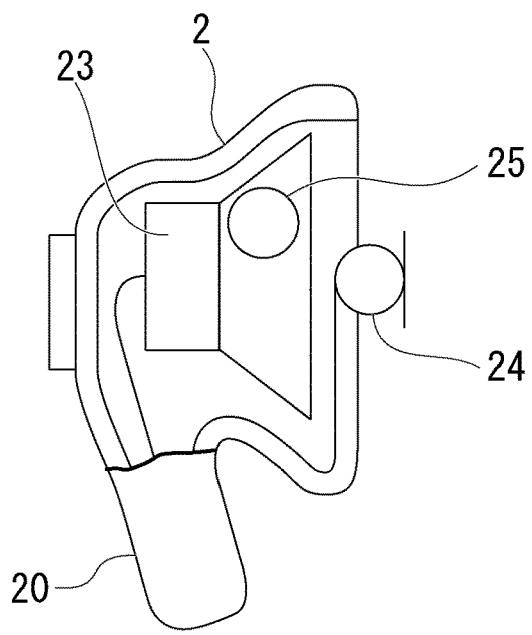
FIG. 3 is a block drawing that shows the hardware configuration of the earphone 2 in the first example embodiment.

FIG. 3 is a block diagram showing the hardware configuration of an earphone 2 in the first example embodiment. The earphone 2 is equipped with an earphone control device 20, a speaker 23, a microphone 24, and a motion sensor 25.

The earphone 2 is an acoustic device that can be worn in the ear of the user H, and is a typically a device capable of wireless communication such as a wireless earphone or wireless headset. The speaker 23 functions as a sound wave generator that emits sound waves toward the ear canal of the user H when worn, and is located on the wearing side of the earphone 2. The microphone 24 is arranged on the wearing side of the earphone 2 so as to be capable of receiving sound waves that are reflected by the user H's ear canal, etc. when worn.

The motion sensor 25 is a sensor element that detects changes in the position of the earphone 2. The motion sensor 25 may be a 9-axis sensor. A 9-axis sensor is a sensor with the functions of a 3-axis acceleration sensor, a 3-axis angular velocity sensor, and a 3-axis orientation sensor. The three axes are the X, Y, and Z axes in a three-dimensional coordinate system. The motion sensor 25 is built into the earphone 2. The earphone control device 20 controls the speaker 23, microphone 24, and motion sensor 25, and communicates with the information communication device 1.

Figure 4:
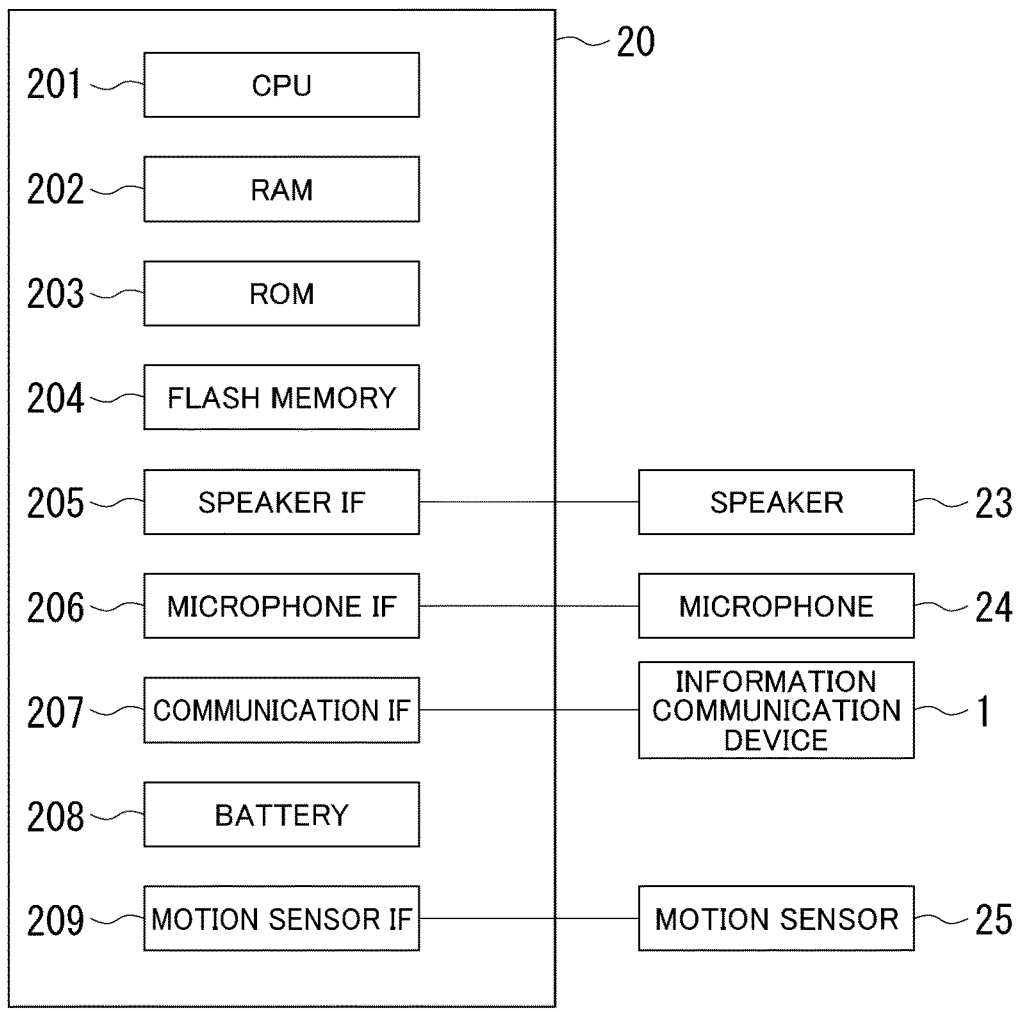
FIG. 4 is a block drawing that shows the hardware configuration of the earphone control device 20 in the first example embodiment.

FIG. 4 is a block diagram showing the hardware configuration of the earphone control device 20 in the first example embodiment. The earphone control device 20 is provided with a CPU 201, RAM 202, ROM 203, flash memory 204, speaker IF 205, microphone IF 206, communication IF 207, battery 208, and motion sensor IF 209. The various parts of the earphone control device 20 are interconnected via unshown buses, wiring, driving units, and the like.

The CPU 201 is an arithmetic device that performs predetermined operations according to a program stored in the ROM 203, flash memory 204, and the like. The CPU 201 controls each part of the earphone control device 20. The RAM 202 consists of a volatile storage medium. The RAM 202 provides the temporary memory area necessary for the operation of the CPU 201. The ROM 203 consists of a nonvolatile storage medium. The ROM 203 stores necessary information such as programs used in the operation of the earphone control device 20. The flash memory 204 is a storage device consisting of a nonvolatile storage medium. The flash memory 204 is used for temporary storage of data and storage of programs for operation of the earphone control device 20.

The speaker IF 205 is an interface for driving the speaker 23. The speaker IF 205 includes a digital-to-analog conversion circuit, an amplifier, and other components. The speaker IF 205 converts audio data to analog signals and supplies them to the speaker 23. This causes the speaker 23 to emit sound waves based on the audio data.

The microphone IF 206 is an interface for acquiring signals from the microphone 24. The microphone IF 206 includes an analog-to-digital conversion circuit, an amplifier, and other components. The microphone IF 206 converts analog signals generated by sound waves received by the microphone 24 into digital signals. This allows the earphone control device 20 to acquire audio data based on the received sound waves.

The communication IF 207 is a communication interface that enables the transmission and reception of data and control information, etc., with other devices. The communication IF 207 is based on standards such as Bluetooth (registered trademark) and Wi-Fi (registered trademark), for example. In the case where the earphone 2 is used in both ears of the user H as a pair, the two earphones 2 as a pair may be able to communicate with each other using the communication IF 207.

The battery 208 provides the power necessary to operate the earphone 2. The battery 208 is, for example, a rechargeable battery. The battery 208 is built into the earphone 2, allowing the earphone 2 to operate wirelessly without a wired connection to an external power source. The motion sensor IF 209 is an interface for acquiring signals from the motion sensor 25. The motion sensor IF 209 includes an analog-to-digital conversion circuit, an amplifier, and the like.

The hardware configuration shown in FIG. 4 is an example, and devices other than these may be added, or some of the hardware shown in FIG. 4 may not be provided. Some of the devices may be replaced by other devices with similar functions. For example, the earphone 2 may be further equipped with an input device, such as a button, with such an input device being capable of accepting operations by the user H. The earphone 2 may be further equipped with a display, indicator light, or other display device to provide information to the user H. Thus, the hardware configuration shown in FIG. 2 can be modified as needed.

Figure 5:
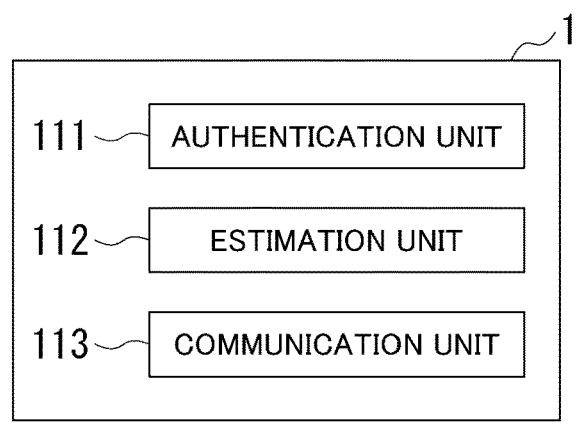
FIG. 5 is a functional block drawing of the information communication device 1 in the first example embodiment.

FIG. 5 is a functional block diagram of the information communication device 1 in the first example embodiment. The information communication device 1 is provided with an authentication unit 111, an estimation unit 112, and a communication unit 113. The CPU 101 loads programs stored in the ROM 103, HDD 104, and the like into the RAM 102 and executes the programs to realize the functions of the authentication unit 111 and the estimation unit 112. The estimation unit 112 may generate the estimated information based on the information acquired by the communication unit 113 from the earphone 2 via the communication IF 105.

The communication IF 105 acquires from the earphone 2 information indicating changes in the position of the earphone 2 by the estimation unit 112. The communication IF 105 may acquire the authentication result by the authentication unit 221 of the earphone 2 from the earphone 2. As a result, the communication IF 105 realizes the function of the communication unit 113.

The specific processes performed in the authentication unit 111, the estimation unit 112, and the communication unit 113 are described below. These functions in the information communication device 1 may be realized by the earphone control device 20, or by the information communication device 1 and the earphone control device 20 working together.

Figure 6:
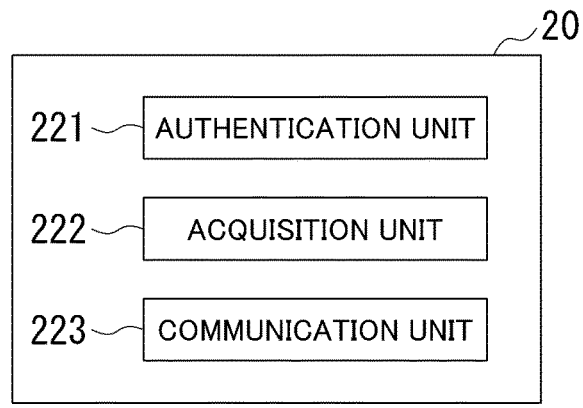
FIG. 6 is a functional block drawing of the earphone control device 20 in the first example embodiment.

FIG. 6 is a functional block diagram of the earphone control device 20 in the first example embodiment. The earphone control device 20 is provided with an authentication unit 221, an acquisition unit 222, and a communication unit 223. The CPU 201 loads programs stored in the ROM 203, the flash memory 204 and the like into the RAM 202 and executes the programs. This allows the CPU 201 to perform the functions of the authentication unit 221 and the acquisition unit 222. The communication IF 207 realizes the processing performed by the communication unit 223.

The communication IF 207 outputs to the information communication device 1 the results of the authentication of the user H by the authentication unit 221 and/or information indicating the change in the position of the earphone 2. The information indicating changes in the position of the earphone 2 is acquired by the acquisition unit 222.

The authentication unit 221 authenticates the user H (authentication by otoacoustic authentication). The acquisition unit 222 acquires information indicating changes in the position of the earphone 2 by controlling the motion sensor 25 with the motion sensor IF 209. The specific processes performed in the authentication unit 221, the acquisition unit 222, and the communication unit 223 are described below. These functions in the earphone 2 may be realized by the information communication device 1 or by the cooperation of the information communication device 1 and the earphone control device 20.

Figure 7:
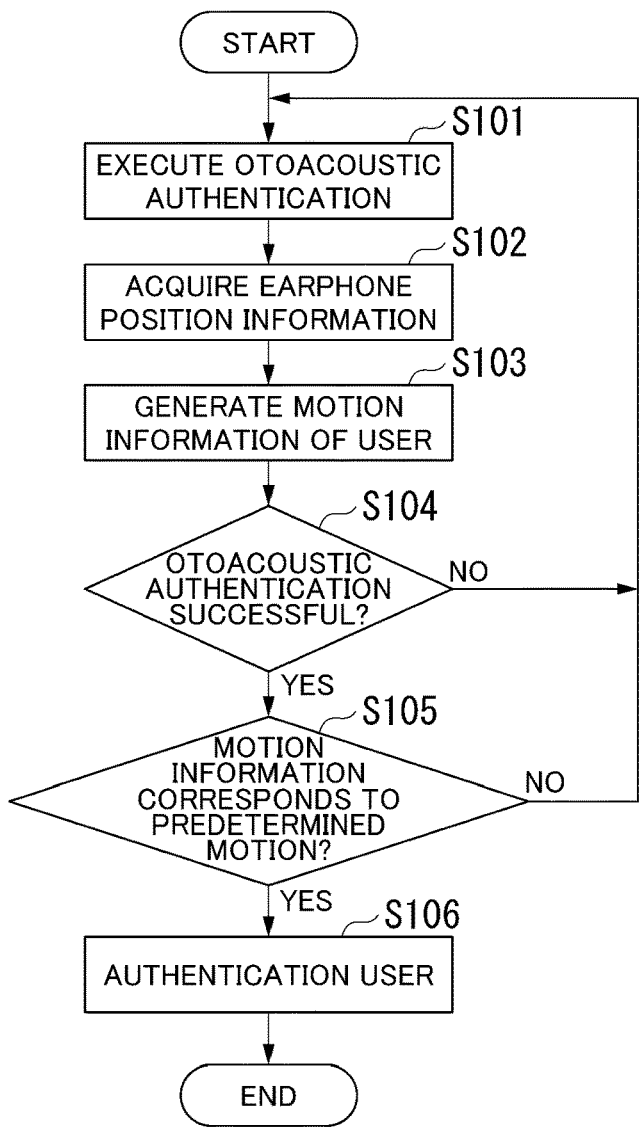
FIG. 7 is a flowchart that shows the process flow of the estimation system S in the first example embodiment.

FIG. 7 is a flowchart showing the process flow of the estimation system S in the first example embodiment. First, it is assumed that the earphone 2 is pre-registered with the information communication device 1. For example, In the case where the earphone 2 connects to the information communication device 1 via Bluetooth (registered trademark), it is assumed that the earphone 2 has been paired with the information communication device 1. It is also assumed that the information communication device 1 is activated but the screen is locked.

In Step S101, the authentication unit 221 performs authentication of the user H using the CPU 201 and at least one of the RAM 202, the ROM 203, the flash memory 204, the speaker IF 205, the speaker 23, the microphone IF 206 and the microphone 24. In other words, the authentication unit 221 determines whether or not the user H is a registrant by means of otoacoustic authentication.

Otoacoustic authentication is a biometric authentication that collates the acoustic characteristics of the user H's ear canal. By emitting inspection sound waves into the ear canal of the user H by the speaker 23 and receiving the sound waves reflected by user H's ear canal by the microphone 24, the earphone 2 can acquire the acoustic characteristics of the user H's ear canal.

The authentication unit 221 can determine whether the user H is a registrant or not by collating the feature quantities extracted from the acquired acoustic characteristics of the ear canal with the feature quantities extracted from the acoustic characteristics of the registrant's ear canal. A registrant is a person who is an authorized user of the earphone 2 and for whom the acoustic characteristics or feature quantities of the ear canal have been registered. This authentication allows the earphone 2 functions to be restricted for unauthorized persons and prevents unauthorized persons from using the earphone 2.

In the present example embodiment, the acoustic characteristics of the registrant's ear canal are assumed to be stored in advance in the ROM 203, etc., however, the acoustic characteristics of the registrant's ear canal may be acquired from other devices such as the information communication device 1 during authentication.

The acoustic characteristics acquired in otoacoustic authentication are typically those resulting from resonance in the ear canal. Acoustic characteristics acquired in otoacoustic authentication can also include acoustic characteristics resulting from reverberation in tissues surrounding the ear canal, such as the skull. The examination sound waves do not have to be emitted directly into the ear canal. The examination sound waves may be emitted to a portion of the user H's head by a bone-conduction speaker. The communication unit 223 outputs the result of the authentication by otoacoustic authentication to the information communication device 1. The communication unit 113 acquires the authentication results using the communication IF 105. The authentication result by otoacoustic authentication indicates whether the authentication of the user H by otoacoustic authentication was successful or failed. After performing the otoacoustic authentication, the authentication unit 221 proceeds to Step S102.

In Step S102, the acquisition unit 222 acquires information indicating a change in the position of the earphone 2 (earphone position information) using the CPU 201 and at least one of the RAM 202, ROM 203, flash memory 204, motion sensor IF 209 and motion sensor 25. In the case where the earphone 2 is worn in the ear of the user H or held by the user H, the earphone position information corresponds to information indicating the movement of the user H. The communication unit 223 outputs earphone position information to the information communication device 1 using the communication IF 207. The communication IF 105 acquires the earphone position information. The communication IF 105 advances the processing to Step S103.

In Step S103, the estimation unit 112 generates information indicating the motion of the user H (motion information) based on the acquired earphone position information. In other words, the estimation unit 112 estimates motion by the user H wearing or holding the earphone. The estimation unit 112 advances the processing to Step S104.

In Step S104, if the acquired authentication result indicates that the otoacoustic authentication was successful, the estimation unit 112 advances the processing to Step S105. If the acquired authentication result indicates that the otoacoustic authentication failed, the estimation unit 112 advances the processing to Step S101.

In Step S105, the estimation unit 112 estimates whether the generated motion information corresponds to a predetermined motion. If the motion information corresponds to the predetermined motion, the estimation unit 112 advances the processing to Step S106. If the motion information does not correspond to the predetermined motion, the estimation unit 112 advances the processing to Step S101. In this case, the communication unit 113 may output information instructing otoacoustic authentication (otoacoustic authentication instruction information) to the earphone 2 using the communication IF 207.

In Step S106, the authentication unit 111 performs authentication of the user H in the information communication device 1. The authentication unit 111 may generate information indicating that the authentication of the user H was successful (authentication success information). The authentication unit 111 may output the authentication success information by means of the output device 107. The authentication unit 111 may output the authentication success information by a predetermined sound or voice, or may display the authentication success information as text or an image on the screen of the information communication device 1. The authentication unit 111 completes the process. As a result, the locked screen of the information communication device 1 is released and the user H can use the information communication device 1.

As described above, the authentication management device according to the first example embodiment of the present disclosure is an authentication management device provided with: a first position acquisition means (e.g., communication unit 113) that acquires first position information indicating a change in the position of a user's first earphone (e.g., earphone 2) equipped with a first authentication means based on otoacoustic authentication; an estimation means (e.g., estimation unit 112) that, on the basis of the acquired first position information, estimates motion of the user wearing the earphone by generating motion information indicating the motion of the user; and a second authentication means (e.g., authentication unit 111) that executes authentication of the user in a device connected to the earphone (e.g., information communication device 1) on the basis of the result of the authentication by otoacoustic authentication and the motion information.

This makes it possible not only to estimate the user's motion, but also to perform authentication the user in other devices connected to the earphone based on the authentication result by otoacoustic authentication and the estimated motion of the user.

The first earphone is used in one of the user's ears, and the otoacoustic authentication is an authentication method that sends out a test sound in the direction of the user's ear canal and authenticates the user based on the reflected sound from the test sound.

This allows for simplified user authentication.

Second Example Embodiment

The estimation system S according to the second example embodiment of the present disclosure is described with reference to the drawings.

Figure 8:
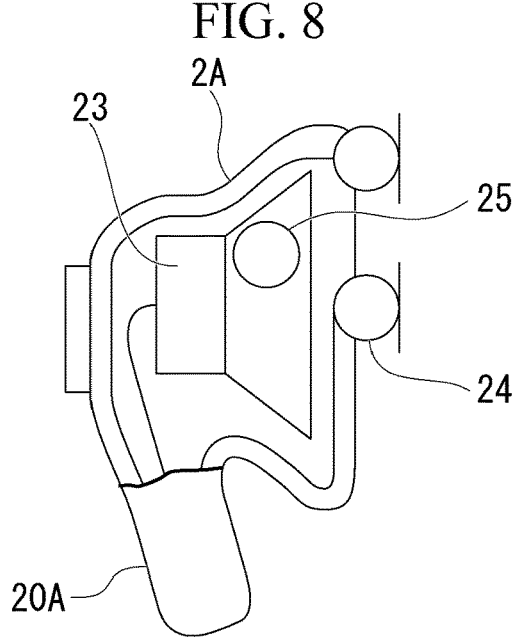
FIG. 8 is a block drawing that shows the hardware configuration of the earphone 2 in the second example embodiment.

FIG. 8 is a block diagram showing the hardware configuration of the earphone 2A in the second example embodiment. The earphone 2A is further provided with a proximity sensor 26 in addition to the earphone 2 in the first example embodiment. The proximity sensor 26 is an element that detects the degree of proximity or contact with an object. The proximity sensor 26 may be an infrared sensor. In this case, the proximity sensor 26 consists of a photodiode or similar device. The proximity sensor 26 functions as a wearing detection unit that detects infrared radiation emitted from the user H when wearing the earphone 2. The proximity sensor 26 is located on the wearing side of the earphone 2.

Figure 9:
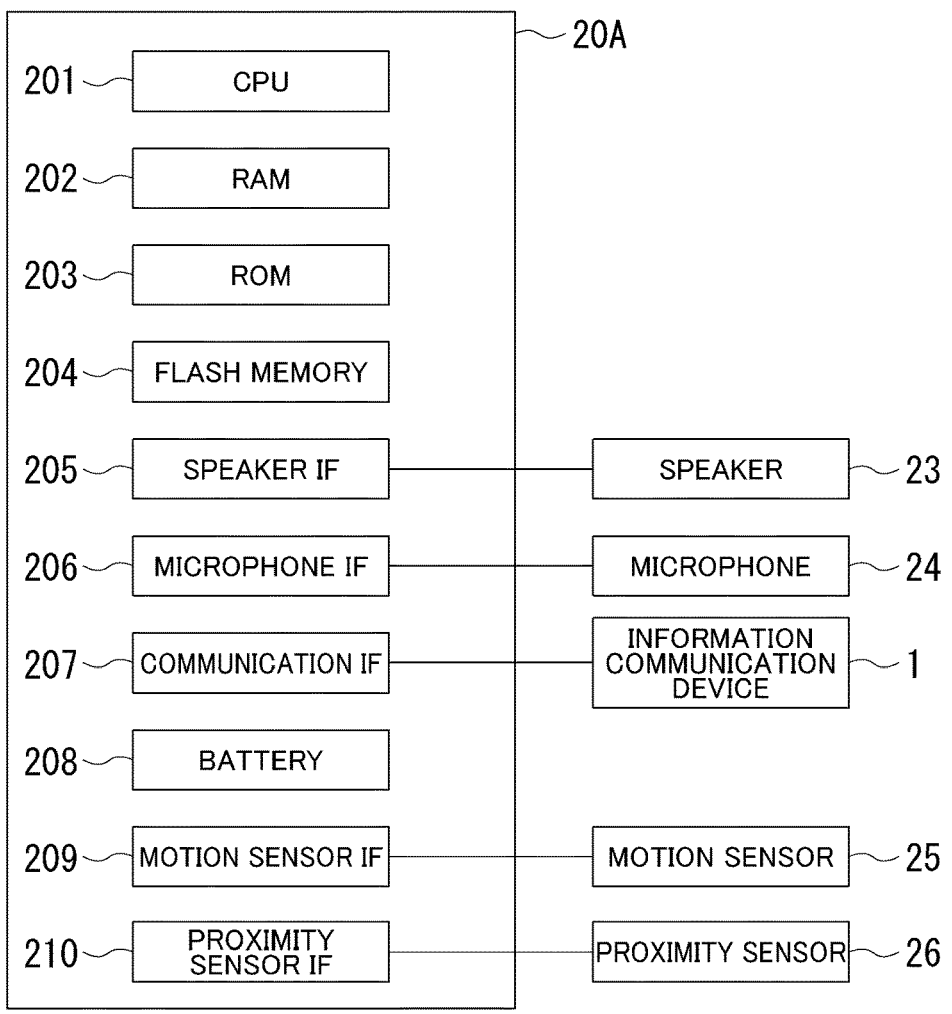
FIG. 9 is a block drawing that shows the hardware configuration of the earphone control device 20A in the second example embodiment.

FIG. 9 is a block diagram showing the hardware configuration of an earphone control device 20A in the second example embodiment. In this example embodiment, the earphone control device 20A is further provided with a proximity sensor IF 210.

Figures 10, 11:
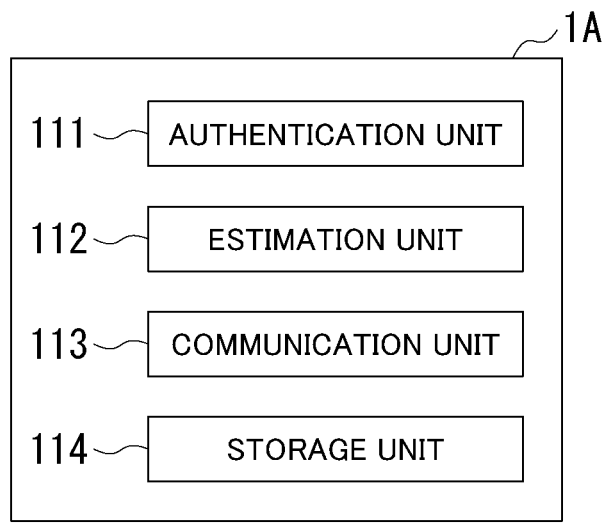
FIG. 10 is a functional block drawing of the information communication device 1A in the second example embodiment.
FIG. 11 is a table that shows correspondence relationships between the acquired data of the motion sensor 25 and motion information in the second example embodiment.

FIG. 10 is a functional block diagram of an information communication device 1A in the second example embodiment. The information communication device 1A consists of a storage unit 114 added to the information communication device 1 of the first example embodiment. The storage unit 114 is realized by at least one of the RAM 102, ROM 103 and HDD 104.

FIG. 11 is a table showing correspondence relationships between the data acquired by the motion sensor 25 and motion information in the second example embodiment. The storage unit 114 stores the correspondence relationships shown in this table in advance in at least one of the RAM 102, ROM 103 and ROM 103.

In FIG. 11, the wearing state of the left and right earphones is shown as determined based on the acquisition data acquired by the proximity sensor 26 for each of a right earphone 2R and a left earphone 2L. The acquired data of acceleration, angular velocity and orientation acquired by the motion sensor 25 of each of the right earphone 2R and left earphone 2L are also shown. Then, specific motion corresponding to those acquired data are shown. The specific motion is the movement of the right earphone 2R and the left earphone 2L, but corresponds to the movement of the user H who wears or holds the right earphone 2R and the left earphone 2L.

For example, in Pattern 1 of FIG. 11, if it is determined that the left and right earphones are being worn, and the measurement results of the acceleration sensor are within the range of a to b (m/s$^2$) for both left and right, and the measurement results of the angular velocity sensor are within the range of A to B (deg./s) for both left and right, and the measurement results of the orientation sensor are between K and L, the corresponding motion is walking of the user H. Other patterns are shown in FIG. 11. The table in FIG. 11 is merely an example, and the present example embodiment is not limited thereto.

Figure 12:
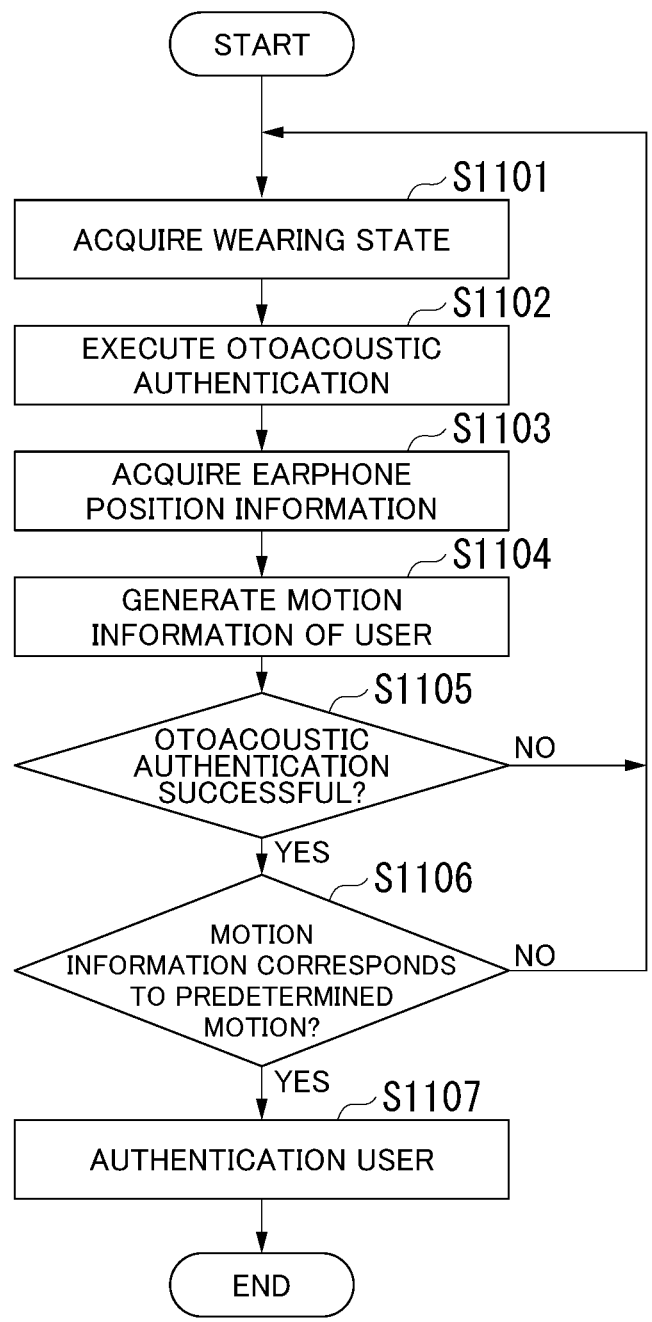
FIG. 12 is a flowchart that shows the process flow of the estimation system S in the second example embodiment.

FIG. 12 is a flowchart showing the process flow of the estimation system S in the second example embodiment. At the beginning of the flowchart shown in FIG. 11, Step S1101 is added to the flowchart shown in FIG. 7.

In Step S1101, an acquisition unit 222 measures the intensity of infrared radiation using the proximity sensor IF 210 and the proximity sensor 26 (infrared sensor). The acquisition unit 222 uses the CPU 201 and at least one of the RAM 202, ROM 203, and flash memory 204, etc. to acquire information indicating whether or not the user H is wearing the earphone 2 (earphone wearing state information) based on the intensity of the infrared radiation measured by the proximity sensor 26.

In the case where the user H is wearing the earphone 2, the infrared radiation emitted from the user H is incident on the proximity sensor 26, so the intensity of the infrared radiation received by the proximity sensor 26 is greater. Thus, the acquisition unit 222 can acquire information on the presence or absence of wearing based on a digital signal indicating the intensity of the infrared radiation received by the proximity sensor 26.

In this case, the decision criterion may be, for example, that the user H is wearing the earphone 2 in the case where the intensity of infrared radiation is above a threshold value. Alternatively, the decision criterion may involve calculating a wear score based on the intensity of the infrared radiation or the change thereof, and determining that the user H is wearing the earphone 2 in the case where the wear score is equal to or greater than a threshold value. The acquisition unit 222 advances the processing to Step S1102.

The process of Step S1102 is similar to the process of Step S101 in FIG. 7, but in Step S1102, the storage unit 114 may store the authentication results.

For the processing Step S1103, in addition to the processing of Step S102, the communication unit 223 outputs earphone wearing state information to the information communication device 1 using the communication IF 207. The communication IF 105 acquires the earphone wearing state information. The communication IF 105 advances the processing to Step S1104.

In Step S1104, the estimation unit 112 estimates the motion of the earphone 2 or user H based on the acquired earphone position information, the earphone wearing state information and the correspondence relationship described in FIG. 10. The estimation unit proceeds to Step S1105.

The processing from Step S1105 to Step S1107 is in principle the same as the processing from Step S104 to Step S106 in FIG. 7.

As described above, the authentication management device according to the second example embodiment of the present disclosure comprises a wearing state acquisition means (e.g., communication unit 113) that acquires wearing state information indicating the wearing state between a user's ear and a first earphone; a storage means (e.g., storage unit 114) that stores in advance correspondence relationships (e.g., the correspondence relationships shown in FIG. 11) between a first position information (e.g., earphone position information), wearing state information and information indicating motion of the user H (e.g., motion information), in which an estimation means generates motion information based on the acquired first position information, the acquired wearing state information, and the correspondence relationship.

This makes it possible not only to estimate the user's motion, but also to authenticate the user in another device connected to the earphone based on the result of authentication by otoacoustic authentication and the estimated motion of the user. The accuracy of estimating the motion of the earphone 2 and the user H can be improved by using a learned model that has been machine-learned using a large amount of supervised data on the correspondence relationship between the earphone position information, wearing state information, and motion information.

The communication unit 113 of the information communication device 1 (e.g., smartphone) may also acquire from another device a request seeking authentication of the user H (authentication request) in the other device. In this case, the communication unit 113 may read the authentication result from the storage unit 114 and output the result to the other device. If the authentication result indicates that the user H has been successfully authenticated, the other device may authenticate the user.

Here, the other device may be, for example, building access control equipment or an authentication device installed at airport baggage checkpoint gates, immigration gates, and the like. The authentication request from the other device may be input directly to the earphone 2 without going through the information communication device 1.

As a result, if the user H is authenticated by the information communication device 1, other devices can authenticate the user H without further authentication processing, thus enabling smooth user access control or authentication by other devices.

Third Example Embodiment

The estimation system S according to the third example embodiment of the present disclosure will be described with reference to the drawings.

Figure 13:
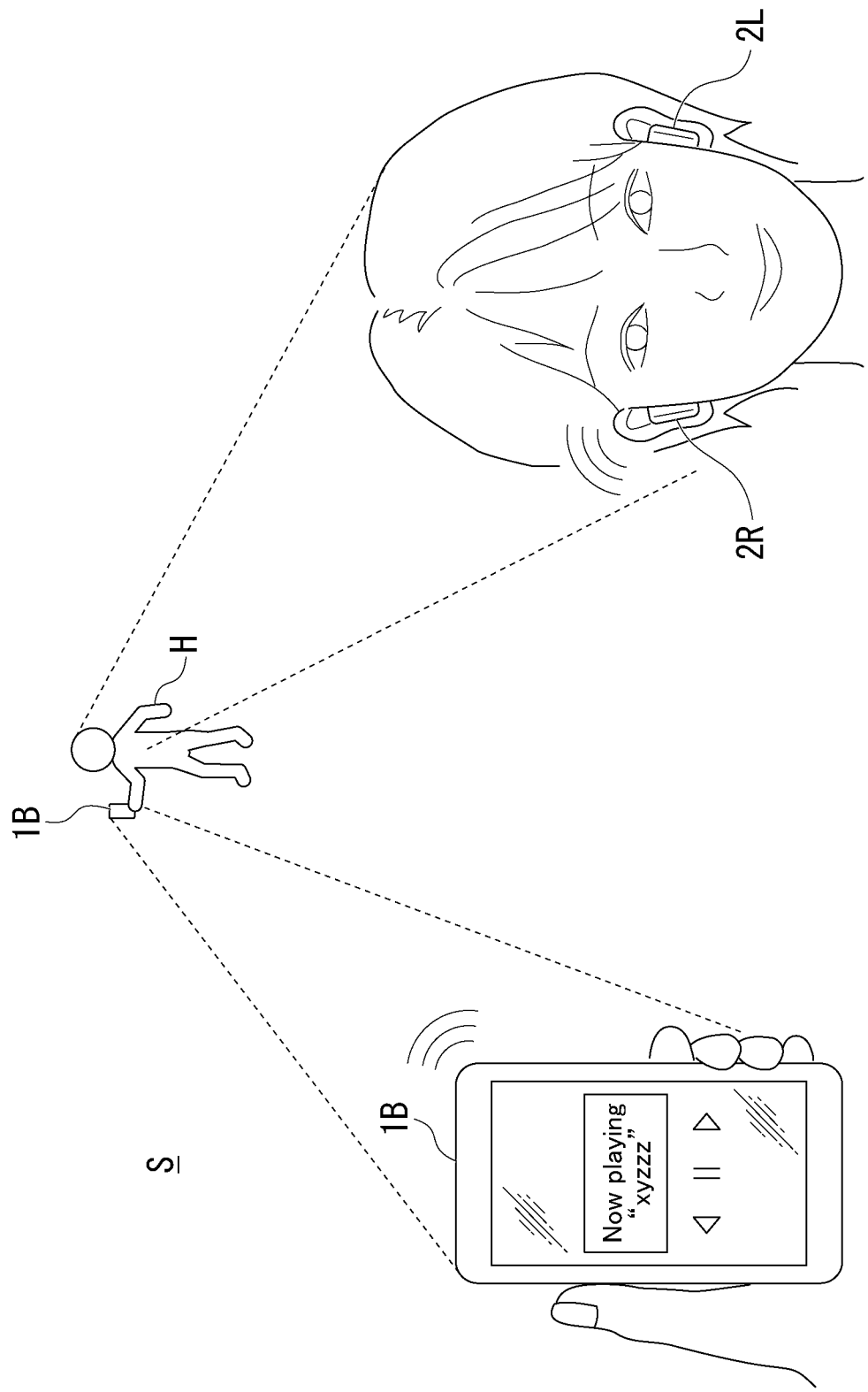
FIG. 13 is a drawing that shows an example of the configuration of the estimation system S in the third example embodiment.

FIG. 13 shows an example of the configuration of the estimation system S in the third example embodiment. In this system, the user H uses a right earphone 2R and a left earphone 2L. The earphone 2R is used for the user H's right ear, and the earphone 2L is used for the user H's left ear.

Figure 14:
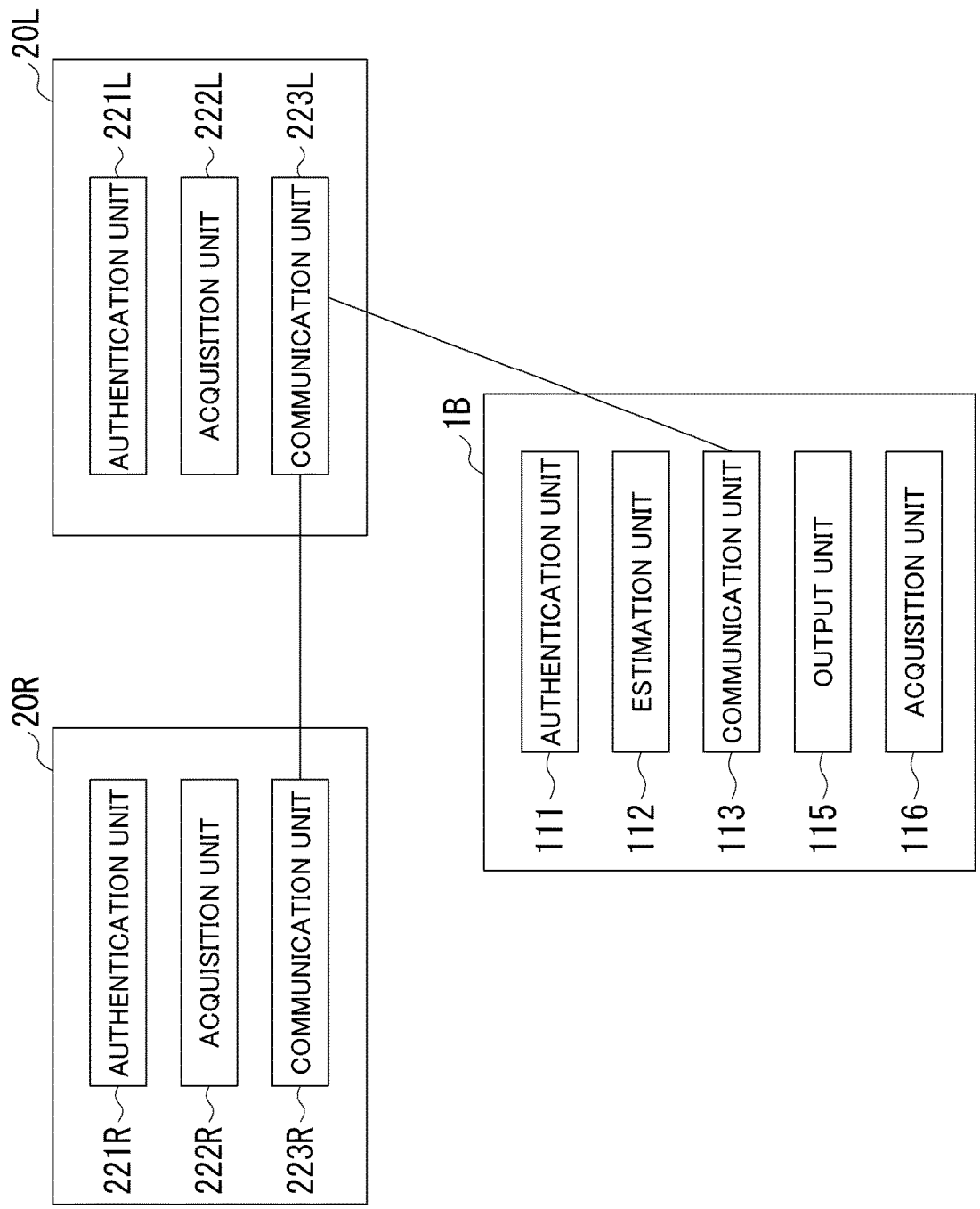
FIG. 14 is a functional block drawing of the information communication device 1B, the earphone control device 20R, and the earphone control device 20L in the third example embodiment.

FIG. 14 is a functional block diagram of an information communication device 1B, an earphone control device 20R and an earphone control device 20L in the third example embodiment. The configuration of the earphone control device 20R and earphone control device 20L is the same as in the first and second example embodiments. The information communication device 1B is provided with an authentication unit 111, an estimation unit 112, a communication unit 113, an output unit 115, and an acquisition unit 116. Details of the operation of the output unit 115 and the acquisition unit 116 are described below.

The configuration of the earphone control device 20R and the earphone control device 20L are the same as in the first and second example embodiments. In this example embodiment, the components with the suffix "R" represent the components of the right earphone. The components with the suffix "L" represents the components of the left earphone 2L. If the suffix "R" or "L" is not appended, it shall indicate not being limited to the right earphone 2R and left earphone 2L.

The earphones 2R and 2L communicate bidirectionally with each other by means of a communication unit 223R, communication unit 223L, and communication IF 207. The left earphone 2L and the information communication device 1B perform bidirectional communication with each other using the communication unit 223L and the communication unit 113, respectively. The right earphone 2R and the information communication device 1B may communicate bidirectionally with each other using the communication unit 223R and the communication unit 113, respectively.

Figure 15:
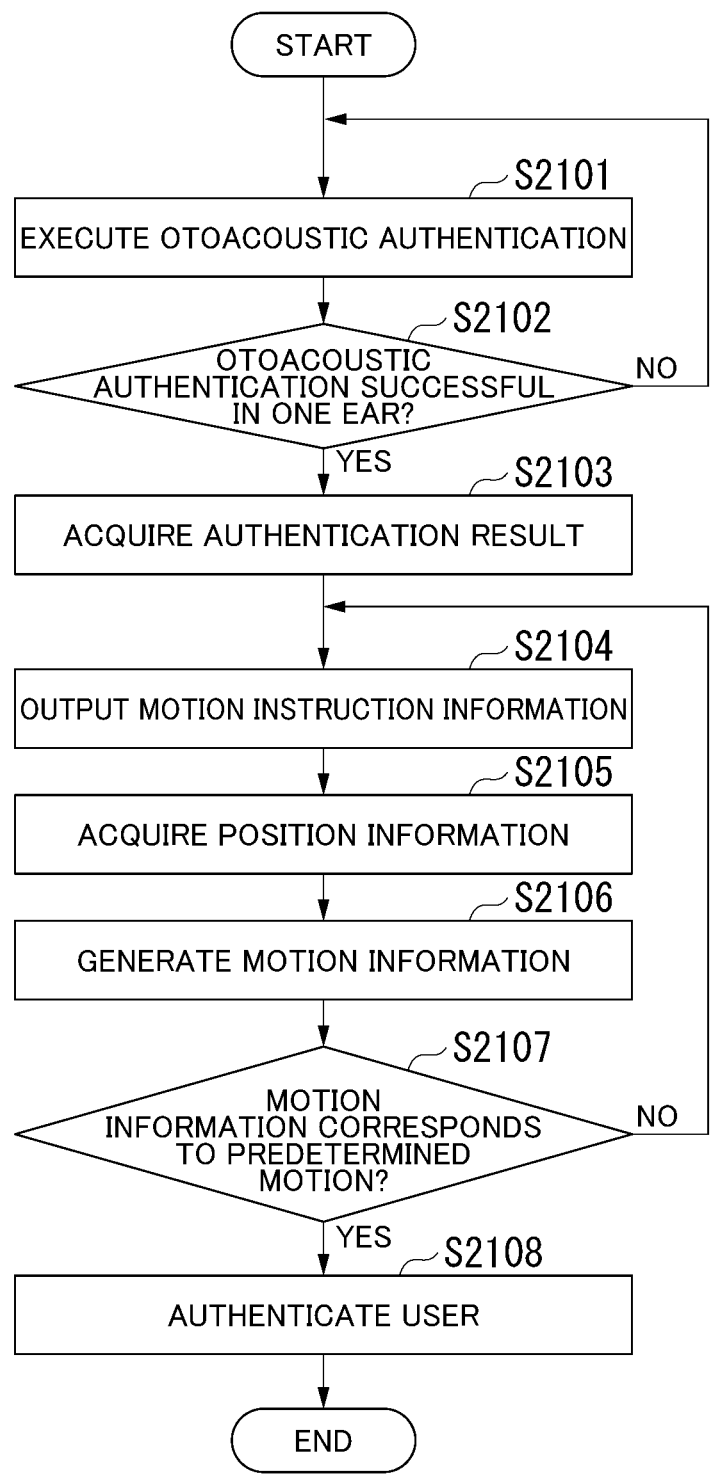
FIG. 15 is a flowchart that shows the process flow of the estimation system S in the third example embodiment.

FIG. 15 is a flowchart showing the process flow of the estimation system S in the third example embodiment.

In Step S2101, the authentication unit 221R and the authentication unit 221L perform an authentication process using otoacoustic authentication. The communication unit 223R outputs the authentication result of the right earphone 2R to the left earphone 2L using the communication IF 207R. The communication unit 223L acquires the authentication result of the right earphone 2R. The authentication units 221R and 221L proceed to Step S2102.

In Step S2102, the authentication unit 221L determines whether the authentication of the user H by otoacoustic authentication is successful in at least one of the right earphone 2R and the left earphone 2L. If the authentication is successful in at least one of the two earphones, the authentication unit 221L proceeds to Step S2103. If authentication fails in both of the two earphones, the authentication unit 221L proceeds to Step S2101.

In Step S2103, the communication unit 223L outputs the authentication results of the right earphone 2R and the left earphone 2L to the information communication device 1B using the communication IF 207L. The acquisition unit 116 acquires the authentication result of the right earphone 2R and the authentication result of left earphone 2L from the earphone 2L using the CPU 101 and at least one of the RAM 102, ROM 103, HDD 104, communication IF 105 and input device 106. The acquisition unit 116 advances the process to Step S2104.

In Step S2104, the output unit 115 outputs the instruction information for the user H to the output device 107 using the CPU 101 and at least one of the RAM 102, ROM 103 and HDD 104. The output device 107 may be the display screen of the information communication device 1B. The display screen of the information communication device 1B may be a touch screen panel. The output unit 115 may output the instruction information by voice.

The instruction information for the user H is information that instructs the user to hold the earphone and perform a predetermined operation (operation instruction information). A predetermined operation may be, for example, an operation performed by the user holding the earphone that failed to authenticate out of the two earphones. If both of the two earphones are successfully authenticated, the predetermined operation may be performed by the user holding either earphone. It is assumed that both earphones are successfully authenticated in this example embodiment. The operation instruction information is assumed to be information that instructs the user H to perform a predetermined operation using the right earphone 2R. Thus, real-time, live inference of the user H's motion based on biometric detection can prevent a malicious third party from hijacking the device and can further improve the accuracy of authentication. The output unit 115 advances the process to Step S2105.

In Step S2105, the user H performs a predetermined operation holding the right earphone 2R based on the operation instruction information. The acquisition unit 222R acquires information indicating changes in the position of the right earphone 2R (earphone position information). The communication unit 223R outputs the acquired earphone position information to the left earphone 2L. The communication unit 223L acquires the earphone position information and outputs the information to the information communication device 1B. The communication unit 113 acquires the earphone location information. The communication unit 223L and the communication unit 113 advance the process to Step S2106.

The process in Step S2106 is similar to the process in Step S103. The process in Step S2106 may be based on the correspondence relationships shown in FIG. 11, as in the process in Step S1104. The estimation unit 112 advances the processing to Step S2107.

The processing in Step S2107 and Step S2108 is the same as in Step S105 and Step S106.

As described above, the authentication management device according to the third example embodiment of the present disclosure is further provided with an output means (e.g., communication unit 113) that outputs operation instruction information instructing a user to change the position of a second earphone (e.g., right earphone 2R) used for the other ear of the user, and a second position acquisition means (e.g., communication unit 113) that acquires second position information indicating a change in the position of the second earphone (e.g., information indicating a change in the position of the second earphone 2R), in which the estimation means (e.g., the estimation unit 112) estimates the operation by the user H on the basis of the operation instruction information and the second position information, and estimates whether the result of the authentication by the first authentication means for the user is correct.

This makes it possible not only to estimate the user's motion, but also to perform authentication of the user in another device connected to the earphone based on the result of the authentication by otoacoustic authentication and the estimated motion of the user. In authentication, by estimating the motion of the user H based on changes in the position of the earphone, it is possible to more securely perform authentication of the user in other devices connected to the earphone.

The output unit 115 may also output the operation instruction information to a display screen as the output device 107. For example, the operation instruction information may be image information (contact instruction information) that instructs a predetermined position or pattern to be traced by a finger on the display screen. The acquisition unit 116 may acquire contact state information indicating the contact state of a specific position by the user in response to the contact instruction information. The estimation unit 112 may estimate whether or not the authentication by otoacoustic authentication is correct based on the contact instruction information and the contact state information. If the estimation unit 112 determines that the authentication by otoacoustic authentication is correct, the authentication unit 111 may authenticate the user H. In other words, in this case, the authentication unit 111 may determine that the user H is a registrant. The contact state information may include the strength of the contact by the user H, the trajectory of the contact or the length of time during which the contact was made.

This makes it possible not only to estimate the user's motion, but also to perform authentication of the user in another device connected to the earphone based on the result of the authentication by otoacoustic authentication and the estimated motion of the user. Furthermore, by estimating the motion of the user H based on changes in the position of the earphone, it is possible to securely authenticate the user in other devices connected to the earphone.

Although preferred example embodiments of the present disclosure have been described in detail with reference to the drawings, specific configurations are not limited to these example embodiments, and designs and the like that do not depart from the gist of this disclosure are also included.

In the example embodiment described above, the earphone 2 is shown as an example of a wearable device, but such a device is not limited to one worn on the ear as long as it can acquire the acoustic information necessary for processing. For example, a wearable device may be a bone-conducting acoustic device.

In the earphone 2 wearing determination by the proximity sensor 26, the proximity sensor 26 may be equipped with a light source such as an LED and a photodiode. The proximity sensor 26 may emit light from a light source and detect the reflected wave of that light with a photodiode. The acquisition unit 222 may acquire the presence or absence of the reflected wave of that light or the time until the reflected wave is received.

In the example embodiment described above, an infrared sensor is exemplified as a means of determining earphone wearing by the proximity sensor 26, but it is not limited thereto as long as wearing determination is possible. For example, the proximity sensor 26 may emit sound waves into the ear canal of the user H, and the acquisition unit 222 may acquire the acoustic characteristics of the echo sound, such as the intensity of the echo sound and echo duration, and thereby make a wearing determination based on the acoustic characteristics of the echo sound. In this case, the speaker 23 and the microphone 24 function as devices not only for otoacoustic authentication, but also for determining the wearing of the device. Therefore, the device configuration can be simplified.

In the first example embodiment described above, it is assumed that the feature quantities are sent from the earphone 2 to the information communication device 1, but it is also possible to send data on the acoustic characteristics of the ear canal. In this case, the process of feature quantity extraction may be performed by the information communication device 1. In this example, the amount of communication increases, but the amount of computation within the earphone 2 can be reduced.

A processing method that records a program causing the operation of the configuration of the aforementioned example embodiments to realize the functions of the example embodiments in a storage medium, reads the program recorded in the storage medium as code and executes the code in a computer is also included within the scope of each example embodiment. In other words, a computer-readable storage medium is also included in the scope of each example embodiment. In addition, not only the storage medium in which the above-mentioned program is recorded, but also the program itself is included in each example embodiment. One or more components included in the example embodiments described above may be an ASIC (application specific integrated circuit), FPGA (field programmable gate array), or other circuit configured to realize the functions of each constituent element.

For example, a floppy (registered trademark) disk, hard disk, optical disk, optical magnetic disk, CD (Compact Disk)-ROM, magnetic tape, non-volatile memory card, and ROM can be used as the storage medium. The programs recorded on the storage media are not limited to those that execute processing by themselves, but also include those that operate on an OS (Operating System) and execute processing in collaboration with other software and expansion board functions.

The services realized by the functions of each of the above forms can also be provided to users in the form of Saas (Software as a Service).

The above example embodiments are merely examples of embodiments for implementing this disclosure, and the technical scope of this disclosure should not be interpreted as being limited thereto. In other words, this disclosure can be implemented in various forms without deviating from its technical concept or its main features.

Figure 16:
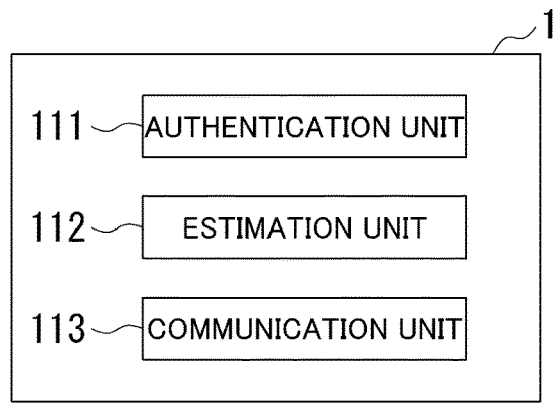
FIG. 16 is a drawing that shows the minimum configuration of the authentication management device in this disclosure.

FIG. 16 is a drawing showing the minimum configuration of the authentication management device in the present disclosure.

The authentication management device according to the present example embodiment should be provided with the authentication unit 111, the estimation unit 112, and the communication unit 113.

The communication unit 113 (acquisition means) acquires first position information indicating a change in the position of the earphone (e.g., either the right earphone 2R or the left earphone 2L).

The estimation unit 112 estimates the motion of the user wearing the first earphone by generating motion information indicating the motion of the user based on the acquired first position information.

The authentication unit 111 performs authentication of the user in the device connected to the earphone based on the result of the authentication by otoacoustic authentication and the motion information.

Figure 17:
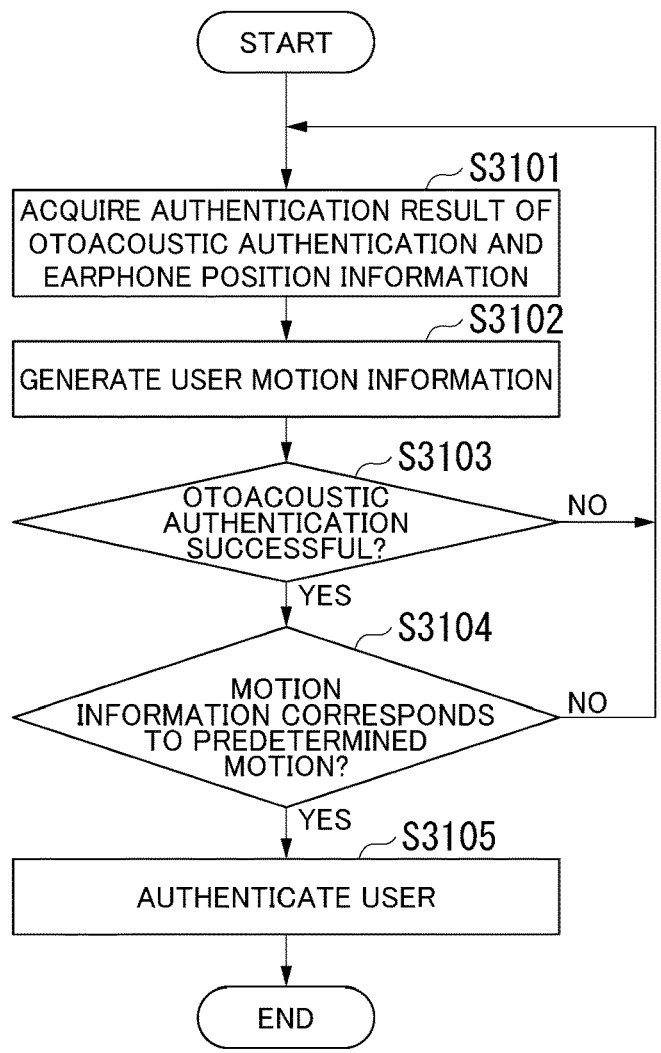
FIG. 17 is a flowchart that shows the process flow in the example embodiment of the minimum configuration of the estimation system S in this disclosure.

FIG. 17 is a flowchart showing the process flow in the example embodiment with the smallest configuration of the estimation system S in this disclosure.

In Step S3101, the communication unit 113 acquires the earphone position information and the result of the authentication by otoacoustic authentication using the communication IF 105. The communication unit 113 advances the processing to Step S3102.

In Step S3102, the estimation unit 112 generates information indicating the motion of the user H (motion information) based on the acquired earphone position information. In other words, the estimation unit 112 estimates the motion by the user H wearing or holding the earphone. The estimation unit 112 advances the processing to Step S3103.

In Step S3103, if the acquired authentication result indicates that the otoacoustic authentication was successful, the estimation unit 112 advances the processing to Step S3104. If the acquired authentication result indicates that the otoacoustic authentication failed, the estimation unit 112 advances the processing to Step S3101.

In Step S3104, the estimation unit 112 estimates whether the generated motion information corresponds to a predetermined motion. If the motion information corresponds to the predetermined motion, the estimation unit 112 advances the processing to Step S3105. If the motion information does not correspond to a predetermined motion, the estimation unit 112 advances the processing to Step S3101. In this case, the communication unit 113 may output information instructing otoacoustic authentication (otoacoustic authentication instruction information) to the earphone 2 using the communication IF 207.

In Step S3105, the authentication unit 111 performs authentication of the user H in the information communication device 1. The authentication unit 111 may generate information indicating that the authentication of the user H was successful (authentication success information). The authentication unit 111 may output the authentication success information by means of the output device 107. The authentication unit 111 may output the authentication success information by a predetermined sound or voice, or may display the authentication success information as text or an image on the screen of the information communication device 1. The authentication unit 111 ends the process. As a result, the locked screen of the information communication device 1 is released and the user H can use the information communication device 1.

Some or all of the above example embodiments may also be described as in the following Supplementary Notes, but are not limited thereto.

Supplementary Note 1

An authentication management device comprising:
a first position acquisition means that acquires first position information indicating a change in the position of a user's first earphone equipped with a first authentication means based on otoacoustic authentication;
an estimation means that, on the basis of the acquired first position information, estimates motion of the user wearing the first earphone by generating motion information indicating the motion of the user; and
a second authentication means that executes authentication of the user in a device connected to the first earphone on the basis of the authentication result by otoacoustic authentication and the motion information.

Supplementary Note 2

The authentication management device according to Supplementary Note 1, comprising:
a wearing state acquisition means that acquires wearing state information indicating the wearing state between an ear of the user and the first earphone; and
a storage means that stores in advance correspondence relationships between the first position information, the wearing state information, and the motion information,
wherein the estimation means generates the motion information based on the acquired first position information, the acquired wearing state information, and the correspondence relationship.

Supplementary Note 3

The authentication management device according to Supplementary Note 1 or 2, further comprising: an output means that outputs earphone operation instruction information instructing the user to change the position of a second earphone used in the other ear of the user; and
a second position acquisition means that acquires second position information indicating a change in the position of the second earphone,
wherein the estimation means estimates whether the authentication result by the first authentication means for the user is correct or not based on the earphone operation instruction information and the second position information.

Supplementary Note 4

The authentication management device according to Supplementary Note 3, wherein the output means outputs contact instruction information instructing the user to touch a specific position on a display element, and
further comprising a third acquisition means that acquires contact state information indicating the contact state of the specific position by the user in response to the contact instruction information,
wherein the estimation means estimates whether the authentication result by the first authentication means for the user is correct or not based on the contact instruction information and the contact state information, and
the contact state information includes the strength of the contact, the trajectory of the contact or the duration of the contact.

Supplementary Note 5

An estimation method used in a computer, comprising:
a first authentication instruction step that instructs authentication of a user by otoacoustic authentication;
a position information acquisition instruction step that instructs acquisition of position information indicating a change in the position of an earphone equipped with a means of executing the authentication by otoacoustic authentication;
an estimation step that, on the basis of the acquired position information, estimates motion of the user wearing the earphone by generating motion information indicating the motion of the user; and
a second authentication step that executes authentication of the user in a device connected to the earphone on the basis of the authentication result by otoacoustic authentication and the motion information.

Supplementary Note 6

A recording medium in which is recorded a program that causes a computer to execute:
an authentication instruction step that instructs authentication of a user by otoacoustic authentication;

a position acquisition instruction step that instructs acquisition of a position signal indicating a change in the position of an earphone equipped with a means that executes the authentication;

an estimation step that, on the basis of the acquired position signal, estimates motion of the user wearing the earphone by generating motion information indicating the motion of the user;

an output step that outputs control information on the basis of the result of the authentication by otoacoustic authentication and the motion information; and a second authentication means that executes a second authentication of the user in a device connected to the earphone on the basis of the control information.

DESCRIPTION OF REFERENCE SIGNS

1 Information communication device
2 Earphone
101, 201 CPU
102, 202 RAM
103, 203 ROM
104 HDD
105, 207 Communication IF
106 Input device
107 Output device
23 Speaker
24 Microphone
25 Motion sensor
26 Proximity sensor
204 Flash memory
205 Speaker IF
206 Microphone IF
208 Battery
209 Motion sensor IF
111, 221 Authentication unit
112 Estimation unit
113, 223 Communication unit
114 Storage unit
222 Acquisition unit
115 Output unit
116 Acquisition unit

What is claimed is:

1. An authentication device comprising:
at least one memory configured to store instructions; and
at least one processor configured to execute the instructions to:
  acquire first position information indicating a change in a position of a user's first earphone executing a first authentication based on otoacoustic authentication;
  estimate motion of the user wearing the first earphone based on motion information indicating the motion of the user, the motion information being generated based on the acquired first position information;
  execute authentication of the user in a terminal connected to the first earphone based on the authentication result by otoacoustic authentication and the motion information;
  output earphone operation instruction information instructing the user to change a position of a second earphone used in the other ear of the user;
  acquire second position information indicating a change in the position of the second earphone; and
  estimate whether the authentication result by the first authentication for the user is correct or not based on the earphone operation instruction information and the second position information.

2. The authentication device according to claim 1, wherein the at least one processor is further configured to execute the instructions to:
  acquire wearing state information indicating the wearing state between an ear of the user and the first earphone;
  store correspondence relationships between the first position information, the wearing state information, and the motion information; and
  generate the motion information based on the acquired first position information, the acquired wearing state information, and the correspondence relationship.

3. The authentication device according to claim 1, wherein the at least one processor is further configured to execute the instructions to
  output contact instruction information instructing the user to touch a specific position on a display element,
  acquire contact state information indicating the contact state of the specific position by the user in response to the contact instruction information; and
  estimate whether the authentication result by the first authentication for the user is correct or not based on the contact instruction information and the contact state information.

4. An authentication method executed by a computer, the authentication method comprising:
  instructing a first authentication of a user by otoacoustic authentication;
  instructing acquisition of position information indicating a change in the position of a user's first earphone executing the first authentication;
  estimating motion of the user wearing the first earphone based on motion information indicating the motion of the user, the motion information being generated based on the acquired first position information;
  executing authentication of the user in a device connected to the first earphone based on the authentication result by the otoacoustic authentication and the motion information;
  outputting earphone operation instruction information instructing the user to change a position of a second earphone used in the other ear of the user;
  acquiring second position information indicating a change in the position of the second earphone; and
  estimating whether the authentication result by the first authentication for the user is correct or not based on the earphone operation instruction information and the second position information.

5. A non-transitory recording medium in which is recorded a program that causes a computer to execute:
  instructing a first authentication of a user by otoacoustic authentication;
  instructing acquisition of a position information indicating a change in the position of a user's first earphone executing the first authentication;
  estimating motion of the user wearing the first earphone based on motion information indicating the motion of the user, the motion information being generated based on the acquired first position information;
  executing authentication of the user in a device connected to the first earphone based on the authentication result by the otoacoustic authentication and the motion information;
  outputting earphone operation instruction information instructing the user to change a position of a second earphone used in the other ear of the user;
  acquiring second position information indicating a change in the position of the second earphone; and estimating whether the authentication result by the first authentication for the user is correct or not based on the earphone operation instruction information and the second position information.

6. The authentication device according to claim 3, wherein the contact state information includes the strength of the contact, the trajectory of the contact or the duration of the contact.

\* \* \* \* \*